(12) United States Patent
Suwabe

(10) Patent No.: US 8,797,564 B2
(45) Date of Patent: Aug. 5, 2014

(54) IMAGE PROCESSING APPARATUS, IMAGE PROCESSING METHOD, AND STORAGE MEDIUM

(75) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/919,213

(22) PCT Filed: Mar. 31, 2009

(86) PCT No.: PCT/JP2009/057028
§ 371 (c)(1),
(2), (4) Date: Aug. 24, 2010

(87) PCT Pub. No.: WO2009/130990
PCT Pub. Date: Oct. 29, 2009

(65) Prior Publication Data
US 2011/0002003 A1   Jan. 6, 2011

(30) Foreign Application Priority Data
Apr. 23, 2008 (JP) .................................. 2008-113229

(51) Int. Cl.
*G06K 15/00* (2006.01)
*G06F 21/62* (2013.01)
*H04N 1/44* (2006.01)
*H04N 1/00* (2006.01)
*G06F 3/12* (2006.01)

(52) U.S. Cl.
CPC .......... *H04N 1/00344* (2013.01); *G06F 21/629* (2013.01); *H04N 1/4433* (2013.01); *H04N 1/00413* (2013.01); *H04N 1/00424* (2013.01); *H04N 1/0048* (2013.01); *H04N 1/00427* (2013.01); *H04N 1/4426* (2013.01); *H04N 2201/0094* (2013.01); *H04N 1/4406* (2013.01); *H04N 1/00411* (2013.01); *G06F 3/1297* (2013.01); *H04N 1/00474* (2013.01)
USPC .......................... 358/1.14; 358/1.16; 358/1.15

(58) Field of Classification Search
CPC . G06F 21/629; G06F 3/1297; H04N 1/00344; H04N 1/00411; H04N 1/00413; H04N 1/00424; H04N 1/00427; H04N 1/00474; H04N 1/0048; H04N 1/4406; H04N 1/4426; H04N 1/4433; H04N 2201/0094
USPC ........ 358/1.13, 1.14, 1.15, 515, 521, 1.1–1.9, 358/1.11–1.18
See application file for complete search history.

(56) References Cited

U.S. PATENT DOCUMENTS

| | | | |
|---|---|---|---|
| 6,848,081 B1 | 1/2005 | Yoda et al. | |
| 7,002,710 B1 * | 2/2006 | Van Liew et al. | 358/3.28 |

(Continued)

FOREIGN PATENT DOCUMENTS

| | | |
|---|---|---|
| JP | 11-134136 A | 5/1999 |
| JP | 2000-354124 A | 12/2000 |
| JP | 2006-048651 A | 2/2006 |
| JP | 2006-74239 A | 3/2006 |
| JP | 2006-157104 A | 6/2006 |
| JP | 2007-095034 A | 4/2007 |
| JP | 2008-052503 A | 3/2008 |
| JP | 2008-052644 A | 3/2008 |

OTHER PUBLICATIONS

U.S. Appl. No. 12/864,227, filed Jul. 22, 2010, Suwabe.

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

An image processing apparatus restricts the use of functions on a user-by-user basis as well as easily suppresses the realization of a function that is equivalent to a restricted function by combining other functions. To accomplish this, an image processing system includes an image processing apparatus and an information processing apparatus that includes function restriction information for restricting, on a user-by-user basis, the use of functions provided by an image processing apparatus. Furthermore, the image processing apparatus acquires function restriction information corresponding to an authorized user, and if a function whose use is restricted by function restriction information can be realized by combining other functions, the image processing apparatus restricts the use of the other functions.

6 Claims, 19 Drawing Sheets

(56) References Cited

U.S. PATENT DOCUMENTS

| | | |
|---|---|---|
| 7,760,380 B2 | 7/2010 | Suwabe |
| 7,788,271 B2 * | 8/2010 | Soma et al. ............ 707/758 |
| 8,049,917 B2 * | 11/2011 | Noguchi et al. ........ 358/1.15 |
| 2005/0108547 A1 * | 5/2005 | Sakai .................... 713/182 |
| 2006/0028678 A1 | 2/2006 | Negishi et al. |
| 2008/0059962 A1 * | 3/2008 | Ito ........................ 718/100 |
| 2008/0170261 A1 * | 7/2008 | Mizutani et al. ....... 358/1.15 |
| 2008/0174790 A1 * | 7/2008 | Noguchi et al. ........ 358/1.1 |
| 2010/0149570 A1 | 6/2010 | Kamiya et al. |

* cited by examiner

FIG. 3

| FUNCTION | FUNCTION DETAILS | Administrator | Power User | General User | Limited User | Guest User |
|---|---|---|---|---|---|---|
| PDL | PRINT PERMIT / DENY | Permit | Permit | Permit | Permit | Permit |
| | FULL-COLOR / MONOCHROME | Color | Color | Color | BW | BW |
| | SINGLE SIDE PERMIT / DENY | Permit | Permit | Permit | Deny | Deny |
| | 1UP / 2UP / 4UP | 1 | 1 | 1 | 4 | 4 |
| | BOX STORAGE PERMIT / DENY | Deny | Deny | Deny | | |
| BOX PRINT | PRINT PERMIT / DENY | Permit | Permit | Permit | Permit | Permit |
| | FULL-COLOR / MONOCHROME | Color | Color | Color | Color | Color |
| | SINGLE SIDE PERMIT / DENY | Permit | Permit | Permit | Deny | Deny |
| | 1UP / 2UP / 4UP | 1 | 1 | 1 | 4 | 4 |
| COPY | PRINT PERMIT / DENY | Permit | Permit | Permit | Deny | Deny |
| | FULL-COLOR / MONOCHROME | Color | Color | Color | BW | BW |
| | SINGLE SIDE PERMIT / DENY | Permit | Permit | Permit | Deny | Deny |
| | 1UP / 2UP / 4UP | 1 | 1 | 1 | 4 | 4 |
| BOX SCAN | SCAN PERMIT / DENY | Permit | Permit | Permit | Permit | Permit |
| | FULL-COLOR / MONOCHROME | Color | Color | Color | Color | Color |
| Send | E-Mail | Permit | Permit | Permit | Deny | Deny |
| | I-FAX | Permit | Permit | Permit | Deny | Deny |
| | FAX | Permit | Permit | Permit | Deny | Deny |
| | FTP | Permit | Permit | Permit | Deny | Deny |
| | NCP | Permit | Permit | Permit | Deny | Deny |
| | SMB | Permit | Permit | Permit | Deny | Deny |
| | BOX | Permit | Permit | Permit | Deny | Deny |
| | WebDAV | Permit | Permit | Permit | Deny | Deny |
| | SEND TO NEW DESTINATION PERMIT / DENY | Permit | Permit | Deny | Deny | Deny |
| | DESIGNATE DESTINATION DOMAIN PERMIT / DENY | No | No | No | Deny | Deny |
| | ATTACH PDF DEVICE SIGNATURE YES / NO | Yes | Permit | Permit | Yes | Yes |
| | SEND WITHOUT DEVICE SIGNATURE PERMIT / DENY | Permit | Permit | Permit | Deny | Deny |

FIG. 4

| USERNAME | uid | GROUP NAME | gid | permission group |
|---|---|---|---|---|
| a | 001 | DEV N | 501 | Limited User |
| b | 002 | DEV N | 501 | Limited User |
| c | 003 | DEV N | 501 | General User |
| d | 004 | DEV N | 501 | General User |
| e | 005 | DEV O | 502 | General User |
| f | 006 | DEV O | 502 | General User |
| g | 007 | DEV O | 502 | Limited User |
| h | 008 | DEV O | 502 | Limited User |
| i | 009 | MGMT P | 510 | Administator |
| j | 010 | MGMT P | 510 | Administator |
| k | 011 | MGMT Q | 511 | Power User |
| l | 012 | MGMT Q | 511 | Power User |
| m | 013 | BIZ T | 520 | Guest User |
| n | 014 | BIZ T | 520 | Guest User |
| | | | | |
| | | | | |
| | | | | |
| | | | | |
| | | | | |
| | | | | |

1021 — USERNAME, 1022 — uid, 1023 — GROUP NAME, 1024 — gid, 1025 — permission group

| USERNAME | uid | GROUP NAME | gid |
|---|---|---|---|
| a | 001 | DEV N | 501 |
| b | 002 | DEV N | 501 |
| c | 003 | DEV N | 501 |
| d | 004 | DEV N | 501 |
| e | 005 | DEV O | 502 |
| f | 006 | DEV O | 502 |
| g | 007 | DEV O | 502 |
| h | 008 | DEV O | 502 |
| i | 009 | MGMT P | 510 |
| j | 010 | MGMT P | 510 |
| k | 011 | MGMT Q | 511 |
| l | 012 | MGMT Q | 511 |
| m | 013 | BIZ T | 520 |
| n | 014 | BIZ T | 520 |

1021  1022  1023  1024 → 1031

| GROUP NAME | gid | permission group |
|---|---|---|
| DEV N | 501 | Limited User |
| DEV O | 502 | General User |
| MGMT P | 510 | Administrator |
| MGMT Q | 511 | Power User |
| BIZ T | 520 | Guest User |

1023  1024  1025 → 1032

500

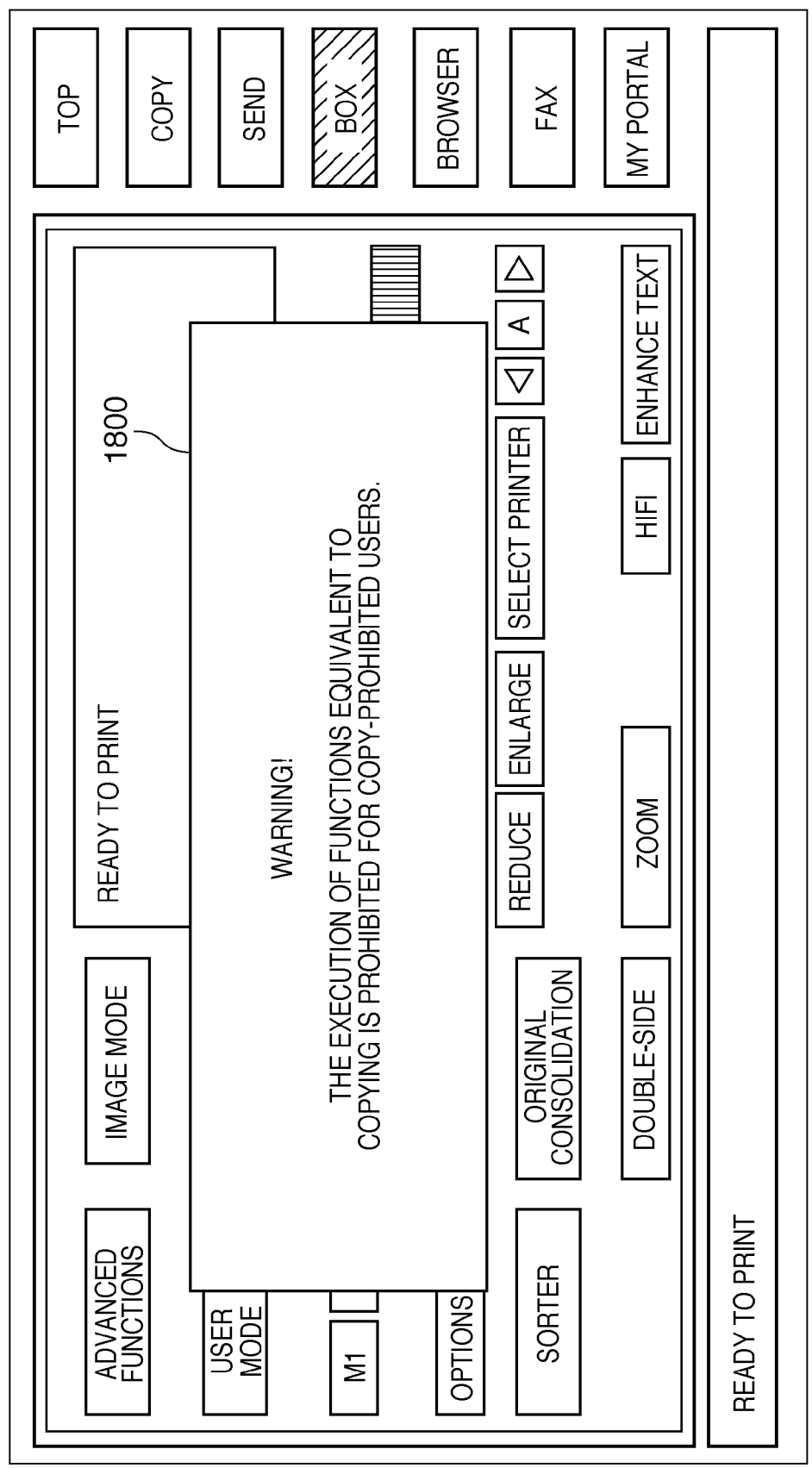

F I G. 19

```xml
<?xml version="1.0" encoding="UTF-8"?>
<ACT xmlnsxsi="http://www.w3.org/2001/XMLSchema-instance">
    <Version>01.01</Version>
    <UserInfo>
        <UserName>a</UserName>
        <GroupName>Development N</GroupName>
        <BaseRole>Limited User</BaseRole>
    </UserInfo>
    <DeviceAccessControl>
        <AttributeCategory Name="DeviceCapablity" CategoryStatus="Static">
            <AttributeStatement>
                <Attribute Name="PdlPrint">
                    <AttributeValue Name="PdlPrintFlag">Permit</AttributeValue>
                    <AttributeValue Name="ColorPrint">BW</AttributeValue>
                    <AttributeValue Name="Simplex">Deny</AttributeValue>
                    <AttributeValue Name="Nup">4</AttributeValue>
                    <AttributeValue Name="PdlToBox">Deny</AttributeValue>
                </Attribute>
            </AttributeStatement>
        </AttributeCategory>
        <AttributeCategory Name="DeviceCapablity" CategoryStatus="Static">
            <AttributeStatement>
                <Attribute Name="BoxPrint">
                    <AttributeValue Name="BoxPrintFlag">Permit</AttributeValue>
                    <AttributeValue Name="ColorPrint">Color</AttributeValue>
                    <AttributeValue Name="Simplex">Deny</AttributeValue>
                    <AttributeValue Name="Nup">4</AttributeValue>
                </Attribute>
            </AttributeStatement>
        </AttributeCategory>
        <AttributeCategory Name="DeviceCapablity" CategoryStatus="Static">
            <AttributeStatement>
                <Attribute Name="Copy">
                    <AttributeValue Name="CopyFlag">Deny</AttributeValue>
                    <AttributeValue Name="ColorCopy">BW</AttributeValue>
                    <AttributeValue Name="Simplex">Deny</AttributeValue>
                    <AttributeValue Name="Nup">4</AttributeValue>
                </Attribute>
            </AttributeStatement>
        </AttributeCategory>
        <AttributeCategory Name="DeviceCapablity" CategoryStatus="Static">
            <AttributeStatement>
                <Attribute Name="BoxScan">
                    <AttributeValue Name="BoxScanFlag">Permit</AttributeValue>
                    <AttributeValue Name="ColorScan">Color</AttributeValue>
                </Attribute>
            </AttributeStatement>
        </AttributeCategory>
    </DeviceAccessControl>
</ACT>
```

IMAGE PROCESSING APPARATUS, IMAGE PROCESSING METHOD, AND STORAGE MEDIUM

TECHNICAL FIELD

The present invention relates to an image processing apparatus and an image processing method that restrict the use of an image processing function on a user-by-user basis, and a storage medium storing a computer program for the same.

BACKGROUND ART

In recent years, networks that interconnect computers have been widely used. Not only computers, but also computer peripheral devices (image processing apparatuses) such as printers, facsimiles, and copiers are also connected with the use of such networks. Among such image processing apparatuses are apparatuses that have a plurality of functions in addition to a copy function, such as a scan function and a data transmission function. Such an apparatus is called an MFP (Multi Function Peripheral). With such image processing apparatuses, there has been demand for a function for performing security setting (restriction setting and the like) regarding user operations, from the viewpoint of the danger of an information leak via printed matter or electronic information.

Image processing apparatuses such as MFPs realize function restrictions on a user-by-user basis, and provide useful functions to users and particularly the manager of the MFP. For example, Japanese Patent Laid-Open No. 11-134136 proposes an information processing apparatus that includes a plurality of functions such as printing, faxing, scanning, and copying. This information processing apparatus manages users by IDs and restricts usable functions, resources, and time on an ID-by-ID basis.

However, the above-described conventional technology has the following problems. For example, the above conventional technology cannot restrict "combinations of individual functions", and therefore there are cases in which a final deliverable that is equivalent to a restricted image processing function can be obtained by combining a plurality of functions. Specifically, assume a case in which a user is prohibited from using the copy function, but is permitted to use stand-alone functions such as storing a scanned image to a storage apparatus and a function for printing from the storage apparatus. In this case, the user can obtain a deliverable that is substantially equivalent to the copy function by, for example, reading an original with use of a scanner, storing the read data in the storage apparatus, reading the image of the original from the storage apparatus, and then printing the read image. Here, "substantially equivalent deliverable" refers to a result that is identical in terms of printed matter, although the image quality and procedure and time required to obtain the deliverable are different.

Disclosure of Invention

The present invention enables realization of an image processing apparatus that restricts the use of a function on a user-by-user basis, and also easily suppresses the realization of a function that is equivalent to a restricted function by combining other functions.

One aspect of the present invention provides an image processing apparatus comprising: an input means for inputting image data; a processing means for processing the image data input by the input means; an acquisition means for acquiring restriction information for restricting an image processing function on a user-by-user basis; and a control means for controlling whether to permit or prohibit the processing performed by the processing means on the image data input by the input means, based on the restriction information acquired by the acquisition means and attribute information indicating an input source of the image data input by the input means.

Another aspect of the present invention provides a method for image processing comprising: inputting image data; processing the image data input in the inputting step; acquiring restriction information for restricting an image processing function on a user-by-user basis; and controlling whether to permit or prohibit the processing performed in the processing step on the image data input in the inputting step, based on the restriction information acquired in the acquiring step and attribute information indicating an input source of the image data input in the inputting step.

Further features of the present invention will become apparent from the following description of exemplary embodiments with reference to the attached drawings.

BRIEF DESCRIPTION OF DRAWINGS

FIG. 3 is a diagram showing a data structure of a function restriction list 35 according to Embodiment 1.

FIG. 4 is a diagram showing an example of a user management list 400 according to Embodiment 1.

FIG. 5 is a diagram showing an example of a user management list 500 according to Embodiment 1.

FIG. 18 is a diagram showing an error display 1800.

FIG. 19 is a diagram showing an example of an ACT 1200.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

The following describes Embodiment 1 with reference to FIGS. 1 to 14 and FIG. 19. The present embodiment describes control for restricting the use of functions that are equivalent to a copy function, in a case where a user is prohibited from using the copy function, but is permitted to store a scanned image to a Box (storage apparatus) and print image data that is stored in a Box. Note that although image data is sometimes called a document in the following description, this does not limit the data format of the image data. Various forms of data can be employed.

Image Processing System Structure

Figure 1:
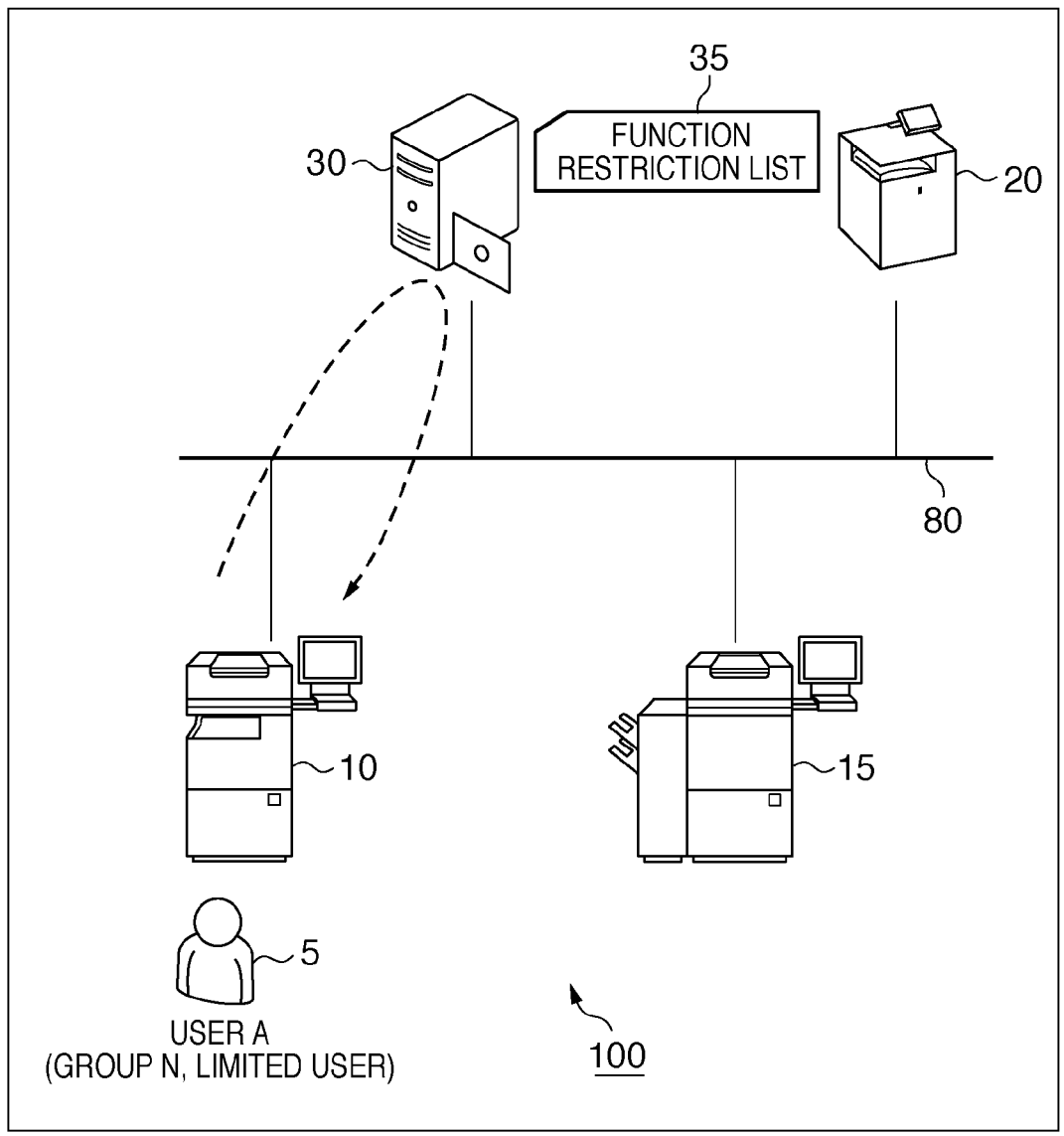
FIG. 1 is a diagram showing an example of an image processing system 100 according to Embodiment 1.

First is a description of a system structure envisioned in the present embodiment with reference to FIG. 1. FIG. 1 is a diagram showing an example of an image processing system 100 according to Embodiment 1.

The image processing system 100 includes image processing apparatuses 10, 15 and 20, and an authentication server 30. Each of the above apparatuses is connected to the other apparatuses via a LAN 80. Reference numeral 5 in FIG. 1 denotes a user who is using the image processing apparatus 10 (hereinafter, called "User a").

Details of the image processing apparatuses 10, 15 and 20 are described later with reference to FIG. 2. The authentication server 30 functions as an information processing apparatus and includes a function restriction list 35 that defines function restriction information on a user-by-user basis. Function restriction information refers to information for restricting the use of functions provided by the image processing apparatuses that are connected to the image processing system 100. For example, the function restriction information includes information indicating that, for a predetermined user, a copy function is prohibited and a scan function and a print function are permitted. Details of the function restriction list are described later with reference to FIGS. 3 to 5.

The following describes an overview of operations performed in the image processing system 100 in a case of the User a executing a desired function of the image processing apparatus 10. The image processing apparatus 10 makes an inquiry to the authentication server 30 based on login information pertaining to the User a, and determines whether execution of the function is permitted. Here, based on information notified by the image processing apparatus 10, the authentication server 30 sends, to the image processing apparatus 10, a later-described ACT (Access Control Token) from the function restriction list 35 managed by the authentication server 30. Upon receiving the ACT, the image processing apparatus 10 executes the function in accordance with the content of the ACT. If the execution of the function is not permitted, the image processing apparatus 10 informs the User a of an error.

Image Processing Apparatus Structure

Figure 2:
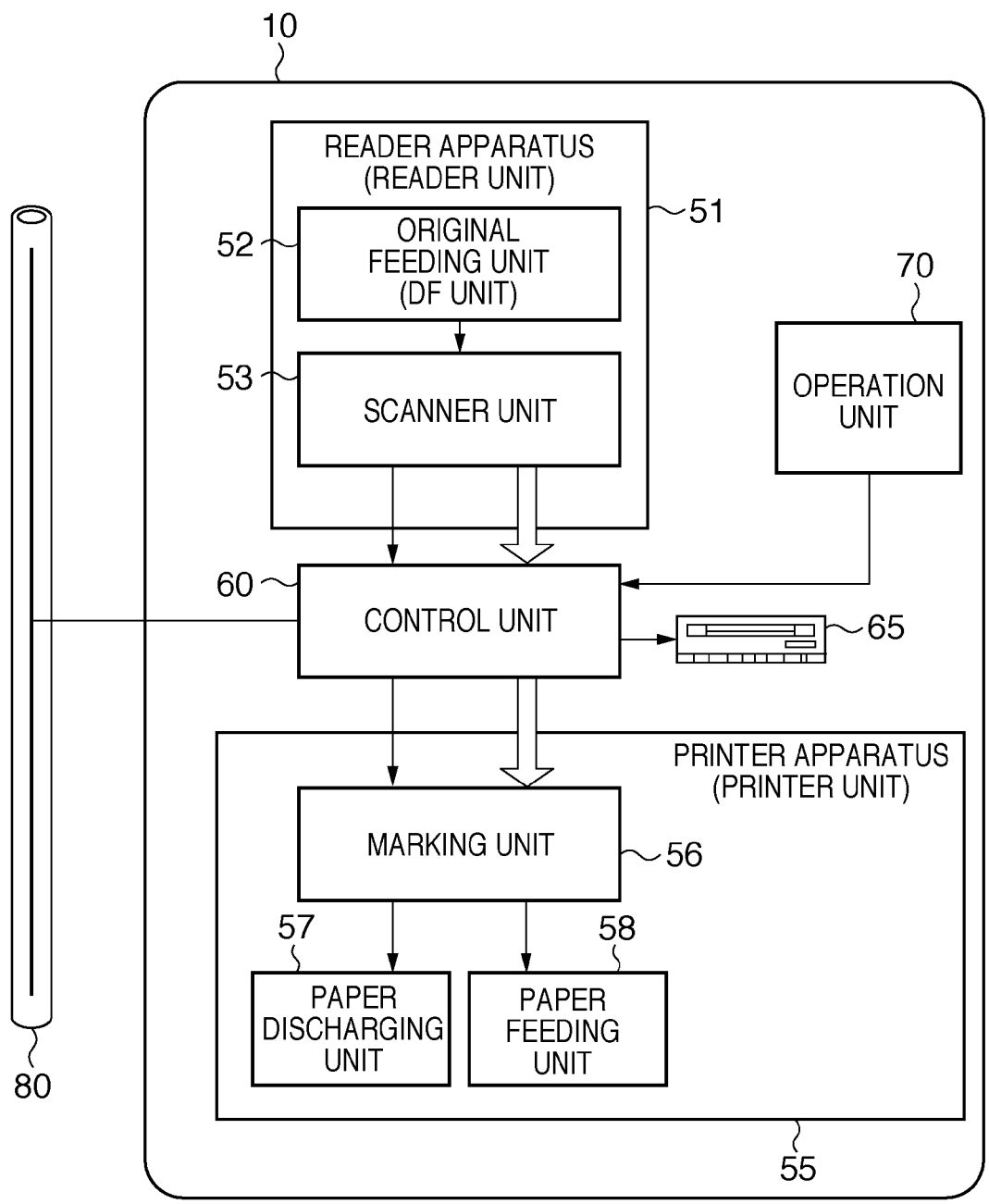
FIG. 2 is a diagram showing an exemplary structure of an image processing apparatus 10 according to Embodiment 1.

The following describes a structure of the image processing apparatuses 10, 15 and 20 with reference to FIG. 2. FIG. 2 is a diagram showing an exemplary structure of the image processing apparatus 10 according to Embodiment 1. A description of the structure of the image processing apparatuses 15 and 20 has been omitted due to being the same as the structure of the image processing apparatus 10.

The image processing apparatus 10 includes a reader unit 51, a control unit 60, a printer unit 55, an operation unit 70, and an HDD 65. The reader unit 51 optically reads an image on an original and generates image data that expresses the image. The reader unit 51 includes an original feeding unit 52 that has a function for conveying original paper, and a scanner unit 53 that has a function for reading an image on an original. Note that there are also cases in which the reader unit 51 does not include the original feeding unit 52. In such a case, an original is placed on a platen glass, and an image is read while scanning the original with use of the scanner unit 53.

The printer unit 55 conveys printing paper, prints image data onto the printing paper as a visible image, and discharges the printing paper out of the apparatus. For this reason, the printer unit 55 includes a marking unit 56, a paper discharging unit 57 and a paper feeding unit 58. The paper feeding unit 58 includes a plurality of types of printing paper cassettes. Also, the marking unit 56 transfers and fixes image data onto printing paper. The paper discharging unit 57 can sort and staple printed printing paper before discharging the printing paper out of the apparatus.

The control unit 60 is electrically connected to the reader unit 51, printer unit 55, operation unit 70, and HDD 65, and furthermore is connected to the LAN 80. The control unit 60 performs overall control of the above connected units. For example, in order to provide the copy function, the control unit 60 controls the reader unit 51 to read image data of an original, and controls the printer unit 55 to output the image data to printing paper. Also, in order to provide a network scanner function, the control unit 60 converts image data obtained by the reader unit 51 by reading an image on an original into code data (an image file), and transmits the code data to an external apparatus via the LAN 80. Furthermore, in order to provide the printer function, the control unit 60 converts code data received from an external apparatus via the LAN 80 into image data, and controls the printer unit 55 to output the image data to printing paper.

The control unit 60 also executes user authentication with respect to a user who is using the image processing apparatus. Details of the authentication method are described later with reference to FIG. 8. The control unit 60 also acquires function restriction information corresponding to an authenticated user from the authentication server 30 via the LAN 80. In a case where a function whose use is restricted according to the function restriction information can be realized by combining other functions, the control unit 60 restricts the use of the other functions. Details of the above are described later with reference to FIGS. 12 and 13.

The operation unit 70 includes a liquid crystal display unit, a touch panel input apparatus provided on the liquid crystal display unit, and a plurality of hard keys. The operation unit 70 provides a user I/F that enables the user to perform various operations. Signals input with use of the touch panel or hard keys are conveyed to the control unit 60. Here, liquid crystal display unit refers to a display device that displays image data sent from the control unit 60.

The HDD 65 is a hard disk that stores image data obtained by the reader unit 51 by reading an image on an original. The HDD 65 is sectioned into a plurality of Boxes. A user can designate a desired Box, and image data can be stored in and read from the desired Box. Hereinafter, the storage function is called a Box function or a document storage function. In addition to a function for storing image data that has been input, the Box function includes a function for reading Stored image data, printing stored image data, and transmitting stored image data to an external apparatus.

Function Restriction List

The following describes the function restriction list 35 managed by the authentication server 30 with reference to FIGS. 3 to 5. FIG. 3 is a diagram showing a data structure of the function restriction list 35 according to Embodiment 1. In order to simplify the description, the function restriction list 35 has been visualized in FIG. 3 using a table structure. The function restriction list 35 described below is stored in a memory of the authentication server 30. Note that although the authentication server 30 is an independent device connected to the LAN 80 in the present description, the function restriction list stored by the authentication server 30 may be stored in the image processing apparatuses. In this case, the image processing apparatuses directly acquire the function restriction information from an internal storage unit without going through a network.

In FIG. 3, 1001 to 1007 denote table columns. Also, 1008 to 1011 denote data (i.e., function restriction information) that is defined in the function restriction list 35. If "Permit" is defined in the function restriction information, the use of the corresponding function is permitted. If "Deny" is defined in the function restriction information, the use of the corresponding function is prohibited. Also, "Color" indicates that color printing is permitted. "BW" indicates that only monochrome printing is permitted. When numeral values and "Yes" and "No" are defined in the function restriction information, the meanings thereof are interpreted in accordance with the content defined in the function details of column 1002.

Column 1001 indicates functions provided by image processing apparatuses included in the image processing system 100. Column 1002 indicates details of the functions indicated in column 1001. Columns 1003 to 1007 indicate function restriction information on a user-by-user basis. Specifically, column 1003 indicates "Administrator", column 1004 indicates "Power User", column 1005 indicates "General User", column 1006 indicates "Limited User", and column 1007 indicates "Guest User".

For example, according to the present embodiment, a "Limited User" is permitted to use a Box print function and a Box scan function (data 1008 and 1010), but is prohibited from using the copy function (data 1009). Although described in detail later, a "General User" in the column 1005 is permitted to use the copy function (data 1011). Note that the Box scan function is a function for storing a scanned image (image data obtained by the reader unit 51 by reading an image on an original) in a Box. The Box print function is a function for reading image data stored in a Box and causing the printer unit 55 to print the image data.

FIG. 4 is a diagram showing an example of a user management list 400 according to Embodiment 1. The management list 400 is a list that collectively manages usernames 1021, uids 1022, group names 1023, gids 1024, and permission groups 1025.

For example, in association with the User a in the management list 400, the uid 1022 is set to "001", the group name 1023 is set to "Dev N", the gid 1024 is set to "501", and the permission group 1025 is set to "Limited User".

FIG. 5 is a diagram showing an example of a user management list 500 according to Embodiment 1. The management list 500 includes a list 1031 and a list 1032. The list 1031 includes the usernames 1021, uids 1022, group names 1023, and gids 1024. The list 1032 includes the group names 1023, gids 1024, and permission groups 1025.

In the present embodiment, either the management list 400 or management list 500 may be applied as the user management list. For example, the management list 400 is effective in a case where there is a desire to perform detailed management of the permission groups 1025 on the basis of individual users. The management list 500 is effective in a case where there is a desire to manage the permission groups 1025 in accordance with to which groups the users belong.

ACT

The following describes the ACT (Access Control Token) acquired from the authentication server 30 with reference to FIG. 19. FIG. 19 is a diagram showing an example of an ACT 1200.

In the ACT 1200, reference numeral 1201 describes a username 1021, group name 1023 and permission group 1025 that were described using FIG. 4 and FIG. 5. Reference numeral 1202 describes function restriction information pertaining to PDL print with respect to the user and group defined in 1201. Reference numeral 1203 describes function restriction information pertaining to the printing of image data stored in a Box with respect to the user and group defined in 1201. Reference numeral 1204 describes function restriction information pertaining to copying with respect to the user and group defined in 1201. Reference numeral 1205 describes function restriction information pertaining to the storage of a scanned image to a Box with respect to the user and group defined in 1201. Based on the ACT 1200, the image processing apparatus 10 determines whether a logged-in user is permitted to execute a specified function.

Box Structure

Figure 6:
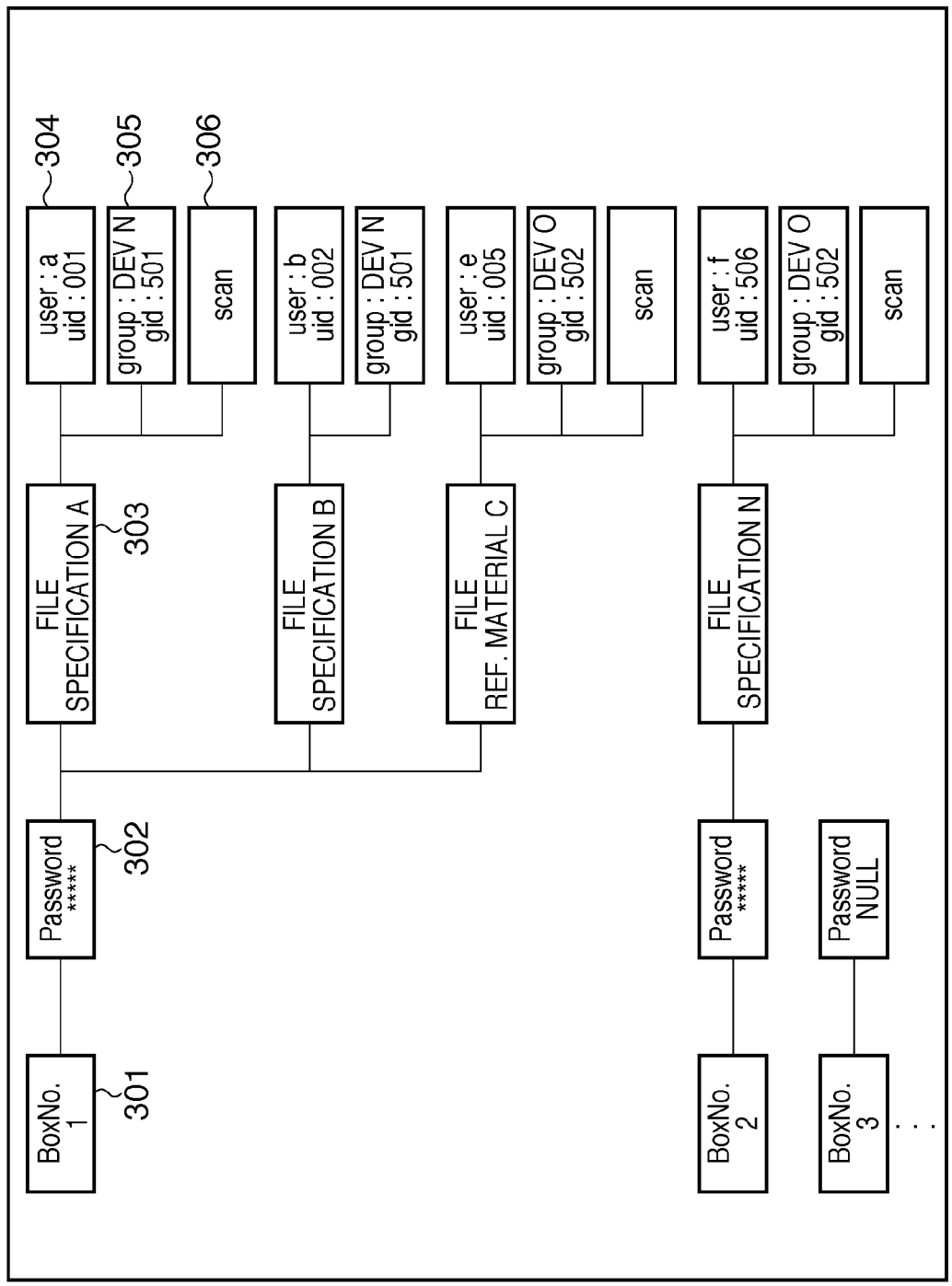
FIG. 6 is a diagram showing an exemplary data structure of a Box according to Embodiment 1.

The following describes the structure of a Box under control of the control unit 60 with reference to FIG. 6. FIG. 6 is a diagram showing an exemplary data structure of a Box according to Embodiment 1. Also, FIG. 6 shows a condition in which documents stored in the Box are hierarchically managed along with attributes thereof.

In FIG. 6, reference numeral 301 denotes a Box number. As shown in FIG. 6, data pieces in the Box are stored in correspondence with Box numbers. Note that a plurality of data pieces can be stored in correspondence with a single Box number.

Reference numeral 302 denotes a Box password. By inputting a Box password, the user can use data corresponding to the Box number.

Reference numeral 303 denotes a document name. Reference numeral 304 denotes a user name and uid of a user who stored (instructed the storage of) the document indicated by 303. Reference numeral 305 denotes a group name and gid of the user who stored the document indicated by 303. Reference numeral 306 denotes attribute information for judging whether the document is a scanned image. In the present embodiment, whether the input source of the document is a reading device (scanner) such as the reader unit 51 is judged by checking the attribute information indicated by 306. If the input source of the document targeted for processing is a reading device, and the use of the copy function is prohibited for the username and uid indicated by 304 or the group name and gid indicated by 305 that corresponds to the document, processing corresponding to the copy function is prohibited. In other words, the printing of a document whose input source is the reading device is prohibited.

Operation Unit

Figure 7:
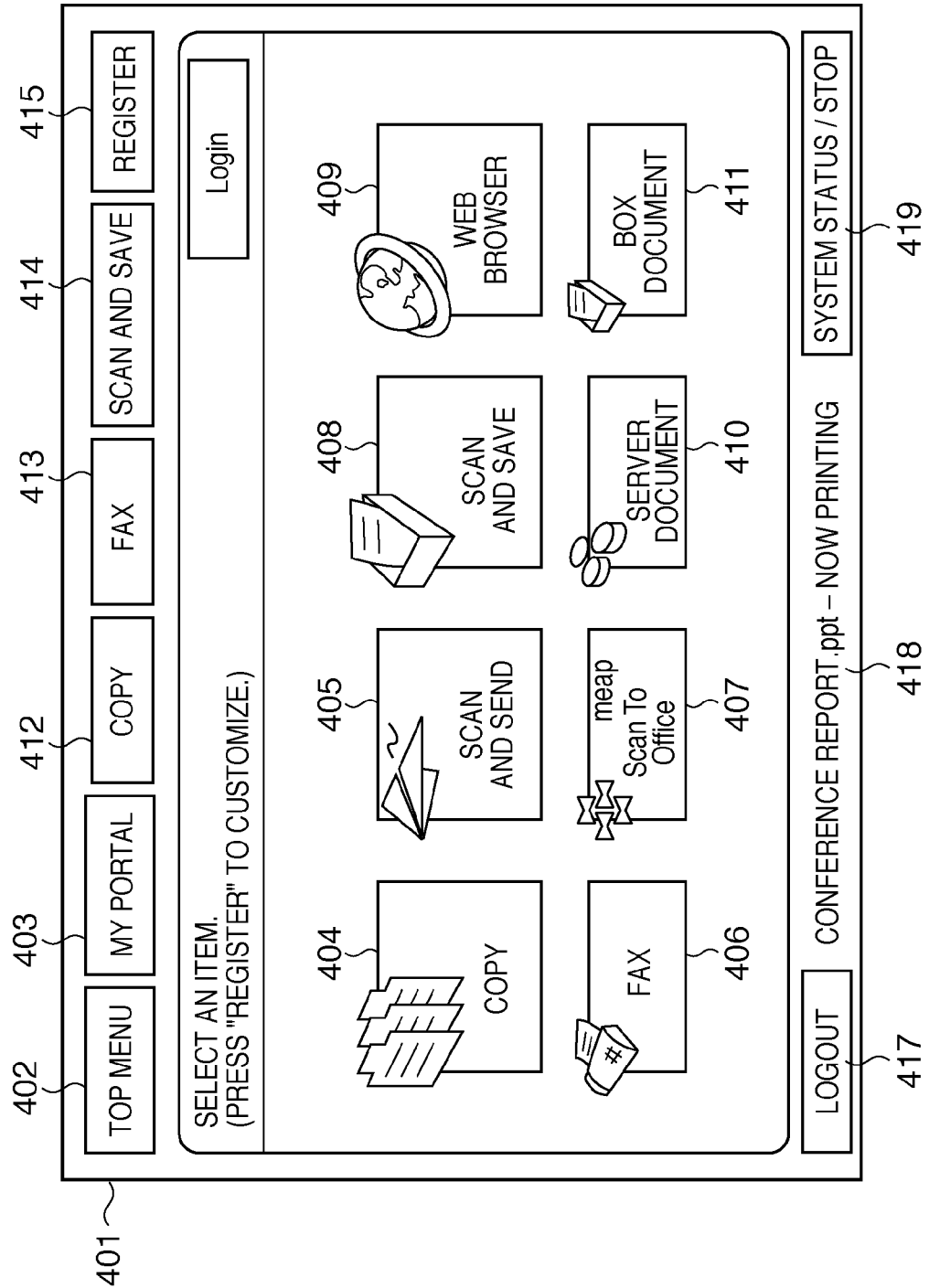
FIG. 7 is a diagram showing an example of an operation unit 70.

The following describes the operation unit 70 of the image processing apparatus 10 with reference to FIGS. 7 to 11. FIG. 7 is a diagram showing an example of the operation unit 70. Reference numeral 401 denotes a liquid crystal display unit of the operation unit 70.

Displayed on the liquid crystal display unit 401 are a top menu key 402, a my portal key 403, function keys 404 to 411, shortcut keys 412 to 414, a register key 415, a login key 416, a logout key 417, and a system status key 419. Furthermore, a status line 418 is displayed on the liquid crystal display unit 401. The status line 418 is an area for displaying, for example, information pertaining to a job being executed and warning information regarding supplies (out-of-toner, etc.).

The top menu key 402 is a key for returning to a display of the top menu screen. When the my portal key 403 has been pressed, a screen showing only information relating to a specified login user is displayed. For example, job information input by the login user, keys unique to the user, and the like are displayed.

Figure 8:
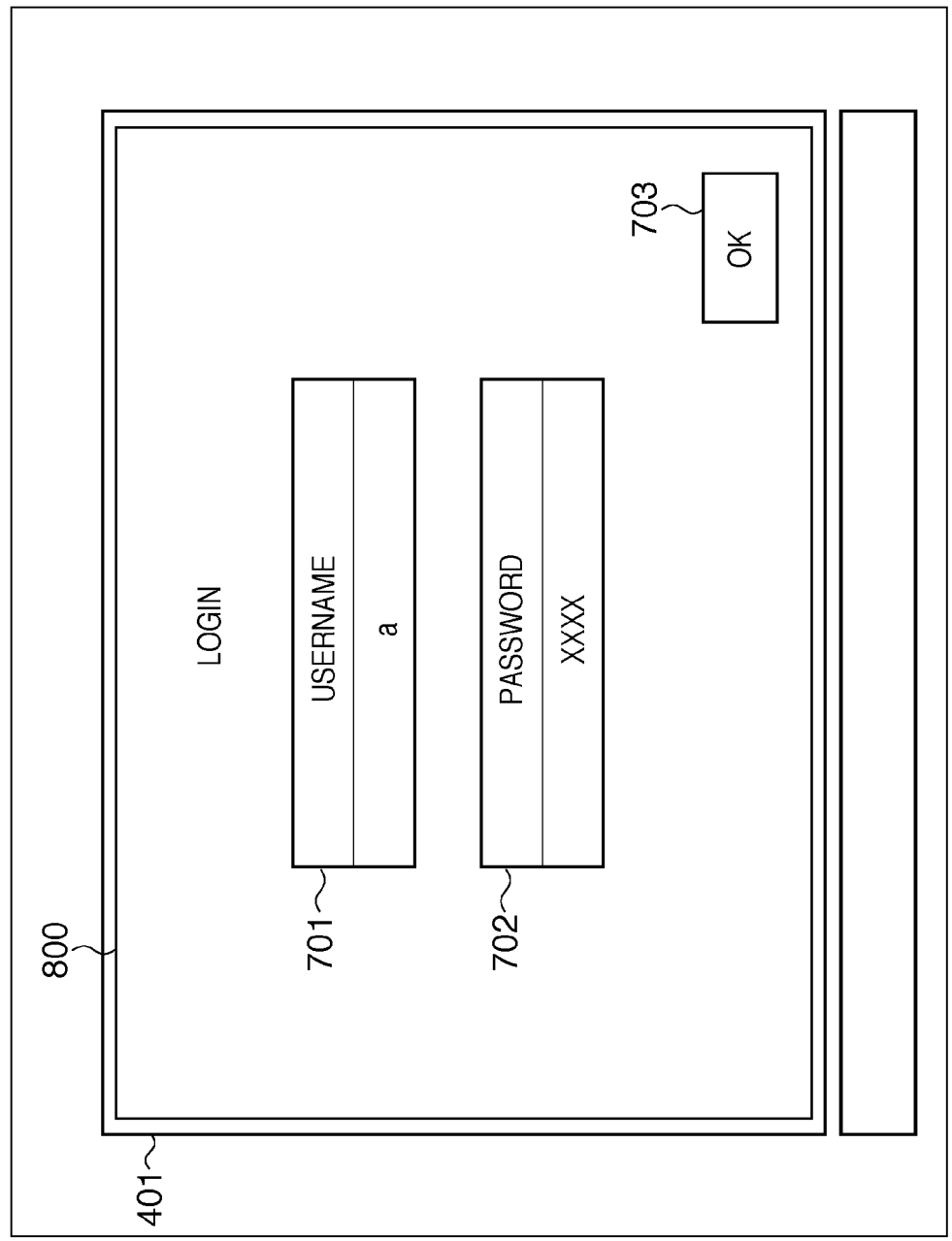
FIG. 8 is a diagram showing a login screen 800.

The function keys 404 to 411 indicate various function keys and allow the user to select a desired function. The shortcut keys 412 to 414 are shortcut keys to various functions. The register key 415 is a key for registering the shortcut keys denoted by 412 to 414. The system status key 419 is a key for displaying a screen that enables browsing information pertaining to, for example, a list of jobs being executed and a job log list. When the login key 416 has been pressed, a screen shown in FIG. 8 is displayed. When the logout key 417 has been pressed, the user is logged out. When the "Box document" function key 411 indicating has been selected, a screen shown in FIG. 9 is displayed.

FIG. 8 is a diagram showing a login screen 800. The login screen 800 is displayed on the liquid crystal display unit 401 if the login key 416 has been pressed.

The login screen 800 includes a username input field 701, a password input field 702 and an OK key 703. A username such as "a" is input in the input field 701. A password corresponding to the username that was input in the input field 701 is input in the input field 702. When the OK key 703 has been pressed after input in the input fields 701 and 702 has been completed, login processing is executed, and the display returns to the screen shown in FIG. 7 if the user has been properly authenticated.

Figure 9:
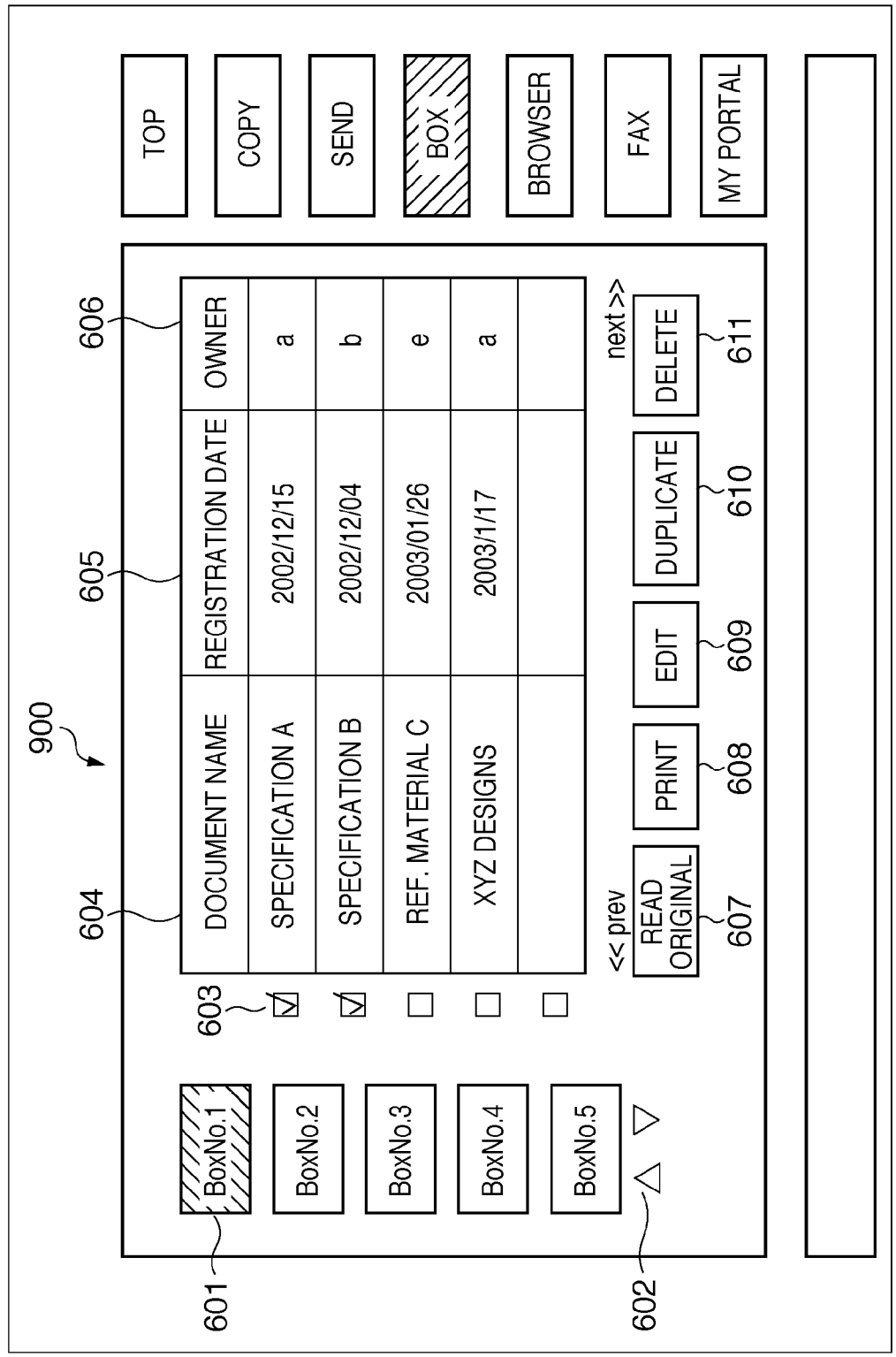
FIG. 9 is a diagram showing a setting screen 900 displayed if a Box document has been selected.

FIG. 9 is a diagram showing a setting screen 900 displayed if "Box document" has been selected. The setting screen 900 is displayed on the liquid crystal display unit 401 if the function key 411 has been pressed.

The setting screen 900 includes Box selection keys 601, scroll keys 602, checkboxes 603, document names 604, registration dates 605, owners 606, a read original read key 607, a print key 608, an edit key 609, a duplicate key 610, and a delete key 611. The Box selection keys 601 are keys that allow the user to select a Box, and simultaneously display which Box is selected. The scroll keys 602 are scroll keys for displaying Box keys that cannot be displayed on the screen due to, for example, a case in which there are 100 Boxes.

The checkboxes 603 are for selecting and unselecting, for example, one or more documents to be printed or deleted. The document names 604 display the names of documents stored in Boxes. The registration dates 605 display the dates when documents displayed in the document names 604 were registered. The owners 606 show, for example, who stored a scanned document. When the read original key 607 has been selected after setting an original to be read on the reader unit 51, image data obtained by causing the reader unit 51 to read an image on the original is stored as a document in the Box having the Box number being displayed. In this case, the logged-in user is the owner of the read document, and the username of the user is displayed as the corresponding owner 606.

Figure 10:
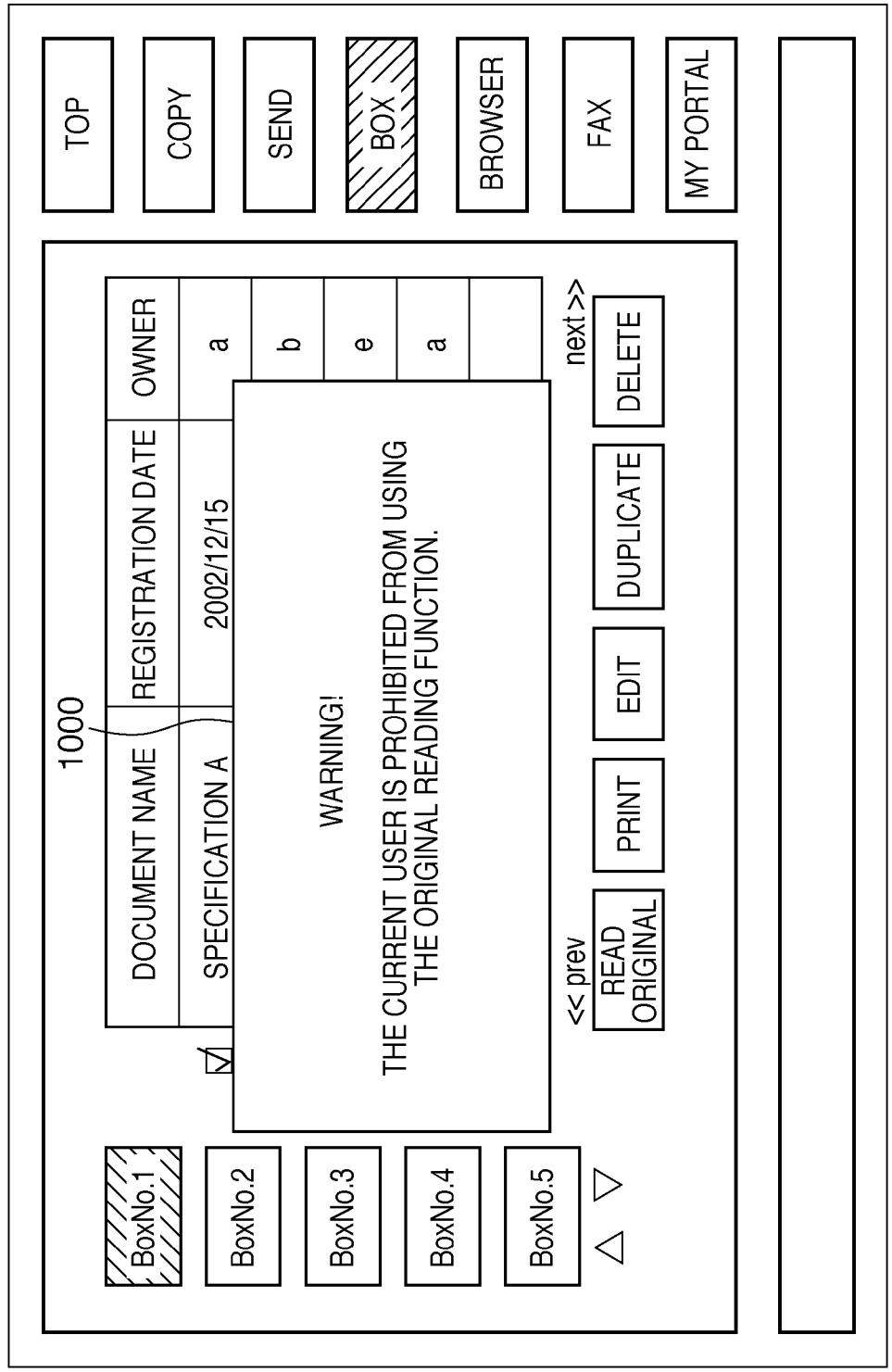
FIG. 10 is a diagram showing an error display 1000.

At the time of reading the original, whether the logged-in user is authorized to perform original reading is determined based on the ACT shown in FIG. 19, which was acquired from the authentication server 30 during login. Here, if reading an original to a Box (Box scan) is prohibited, an error display 1000 shown in FIG. 10 is displayed. FIG. 10 is a diagram showing the error display 1000. As shown in FIG. 10, if the function for reading an original to a Box is prohibited according to the function restriction information, original reading is prohibited, and the error display 1000 is displayed as a pop-up window on the setting screen 900.

Figure 11:
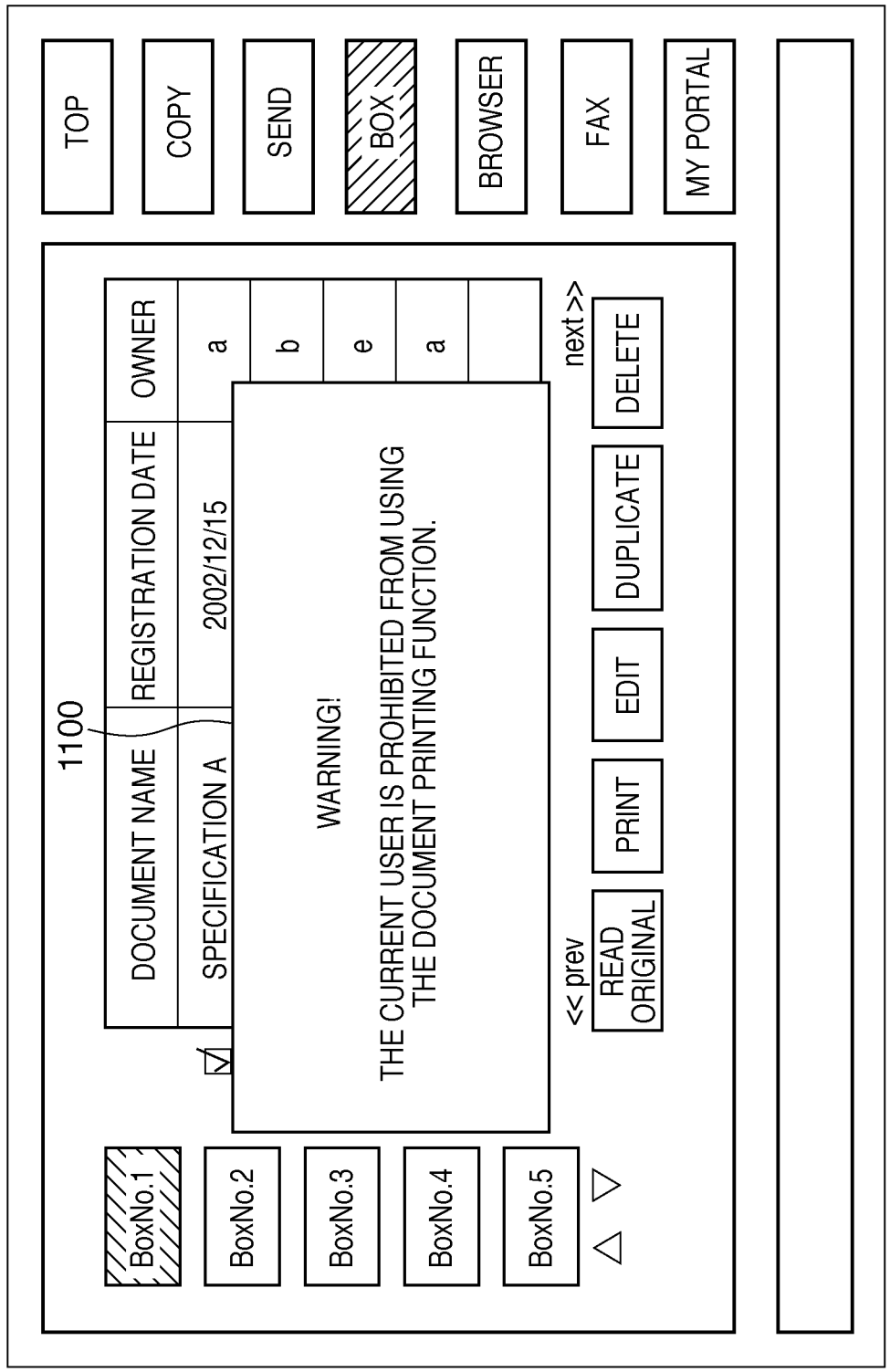
FIG. 11 is a diagram showing an error display 1100.

The print key 608 is a key for causing the printer unit 55 to print documents that are selected in the checkboxes 603. At the time of document printing, whether the logged-in user is authorized to print a document in a Box (Box print) is checked based on the ACT 1200 that was acquired from the authentication server 30 during login. Here, if the user is prohibited from printing from a Box, an error display 1100 shown in FIG. 11 is displayed. FIG. 11 is a diagram showing the error display 1100. As shown in FIG. 11, if the function for printing a document from a Box is prohibited according to the function restriction information, document printing is prohibited, and the error display 1100 is displayed as a pop-up window on the setting screen 900.

The edit key 609 is a key for modifying the document names of documents that are selected in the checkboxes 603. The duplicate key 610 is a key for duplicating documents that are selected in the checkboxes 603. The delete key 611 is a key for deleting documents that are selected in the checkboxes 603.

Function Restriction Control Procedure

Figure 12:
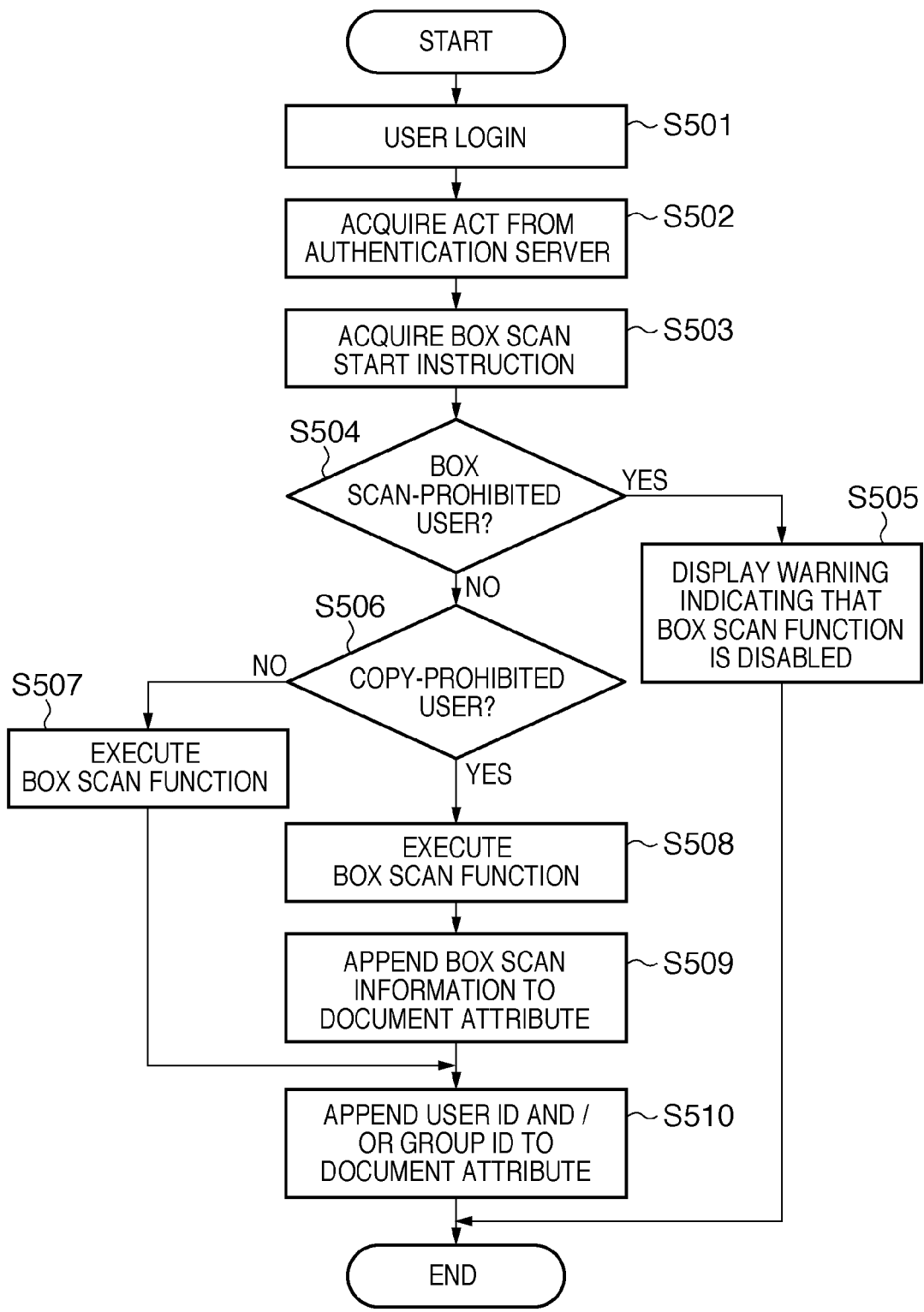
FIG. 12 is a flowchart showing a procedure for controlling reading of an original to a Box according to Embodiment 1.
Figure 13:
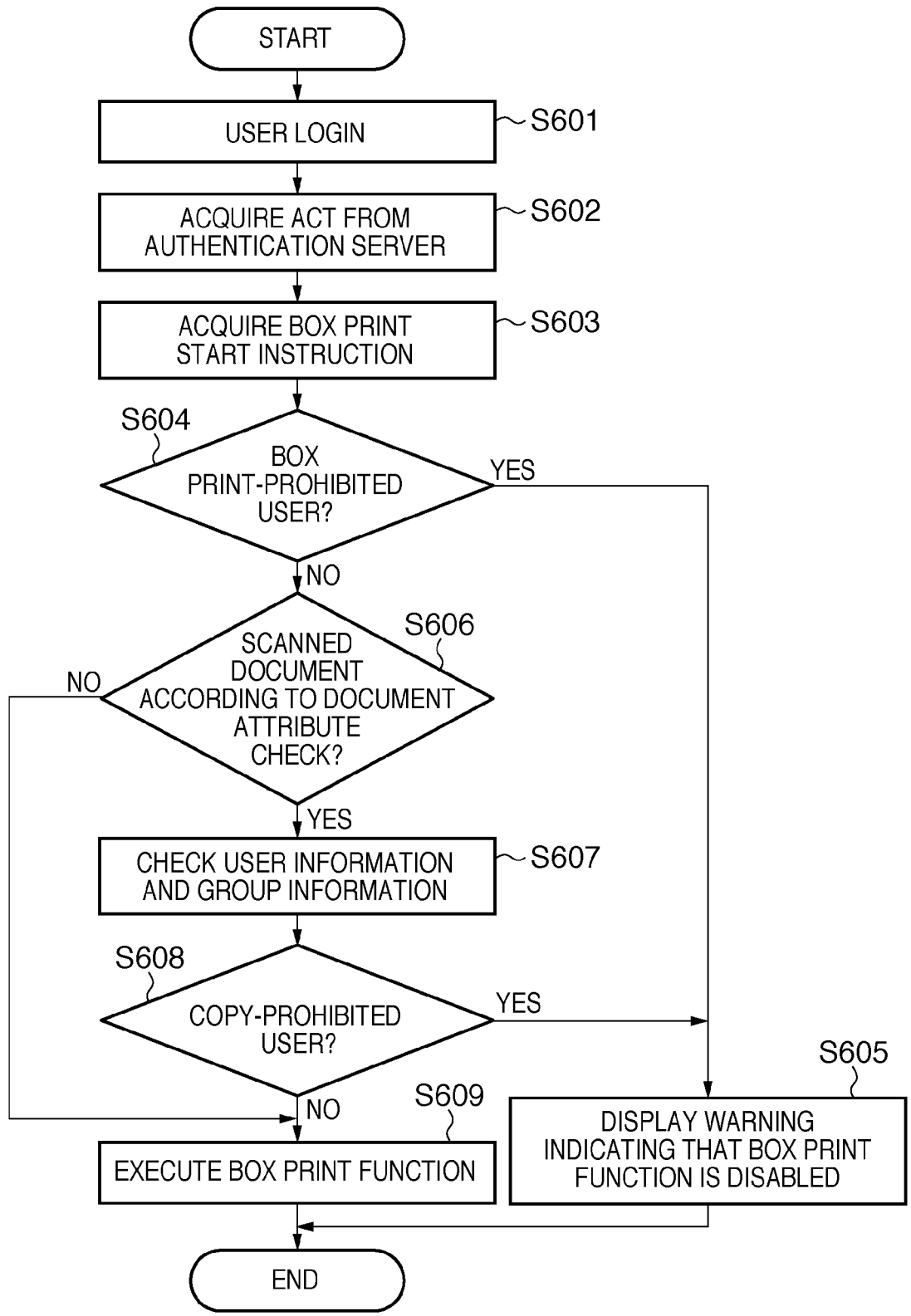
FIG. 13 is a flowchart showing a procedure for controlling printing of an original from a Box according to Embodiment 1.
Figure 14:
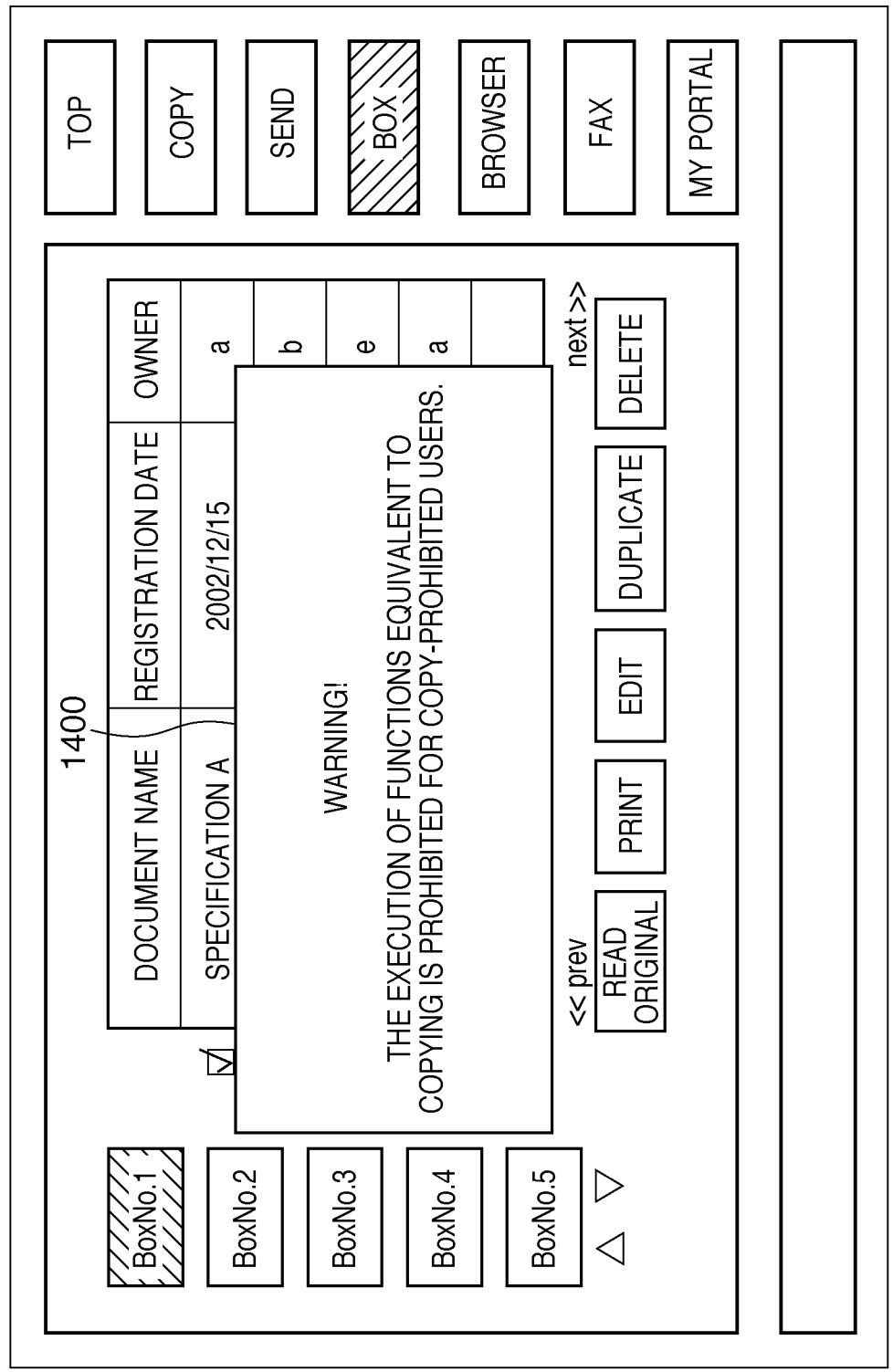
FIG. 14 is a diagram showing an error display 1400.

The following describes a function restriction control procedure according to the present embodiment with reference to FIGS. 12 to 14. The present embodiment is based on the assumption of restricting the provision of functions equivalent to the copy function, in a case where according to the function restriction list 35 stored in the authentication server 30, a user is prohibited from using the copy function but is permitted to use the function for reading an original to a box (Box scan function) and the Box print function.

FIG. 12 is a flowchart showing a procedure for controlling reading of an original to a Box according to Embodiment 1. Overall control of the processing described below is performed by the control unit 60 of the image processing apparatus 10.

First, in step S501 the control unit 60 performs the login processing (user authentication) described in FIG. 8. Here, the User a is considered to perform login. When the User a has performed login, in step S502 the control unit 60 acquires the ACT 1200 from the authentication server 30 that stores the function restriction list 35.

Next, in step S503 the control unit 60 acquires an instruction for starting reading of an original to a Box (Box scan). Here, the user gives the instruction for the start of the original reading by, for example, pressing the read original key 607 on the setting screen 900. When the original reading start instruction has been acquired, in step S504 the control unit 60 determines whether the User a is prohibited from using the Box scan function for scanning to a Box, based on the acquired function restriction information. Here, if the User a is prohibited from using the Box scan function for scanning to a Box, in step S505 the control unit 60 causes the liquid crystal display unit 401 to display the error display 1000 in order to show the user a warning that the Box scan function is disabled.

On the other hand, upon determining in S504 that the User a is permitted to use the Box scan function, in step S506 the control unit 60 determines whether the User a is prohibited from using the copy function based on the acquired function restriction information. Here, if the User a is permitted to use the copy function, in step S507 the control unit 60 executes the Box scan function. Thereafter, the control unit 60 moves the processing to S510.

On the other hand, upon determining in S506 that the User a is prohibited from using the copy function, in step S508 the control unit 60 executes the Box scan function. Furthermore, in step S509 the control unit 60 stores, along with the document, attribute information 306 indicating that the document has been stored to a Box with use of the Box scan function (i.e., indicating that the input source of the document is a reading device). Thereafter, the control unit 60 moves the processing to S510.

In step S510, the control unit 60 stores the user information (username 1021 and uid 1022) 304 and/or group information (group name 1023 and gid 1024) 305 pertaining to the logged-in User a in the Box in which the document is stored, in association with the document.

Therefore according to the present embodiment, at the time of executing the Box scan function, if a user is prohibited from using the copy function but is not prohibited from using the Box scan function for scanning to a Box, information indicating that the stored document has been stored with use of the Box scan function is appended to the document. Furthermore, appending the user information 304 and/or group information 305 at the same time enables preparing a later-described function restriction for document printing. At this time, even if a user who is not prohibited from using the copy function performs the Box scan function, attribute information indicating that a document has been input by the scan function may be appended to the document. This enables prohibiting printing of the document if the copy function becomes prohibited at a later time.

FIG. 13 is a flowchart showing a procedure for controlling printing of a document from a Box according to Embodiment 1. Overall control of the processing described below is performed by the control unit 60 of the image processing apparatus 10.

First, in step S601 the control unit 60 performs the login processing (user authentication) described in FIG. 8. Here, similarly to FIG. 12, the User a is considered to perform login. When the User a has performed login, in step S602 the control unit 60 acquires the ACT 1200 from the authentication server 30 that stores the function restriction list 35.

Next, in step S603 the control unit 60 acquires an instruction for starting printing of a document from a Box. Here, the user gives the instruction for the start of the printing by, for example, pressing the print key 608 on the setting screen 900. When the print start instruction has been acquired, in step S604 the control unit 60 determines whether the User a is prohibited from using the function for printing a document from a Box, based on the acquired function restriction information. Here, if the User a is prohibited from using the function for printing a document from a Box, in step S605 the control unit 60 causes the liquid crystal display unit 401 to display the error display 1100 in order to show the user a warning that the function for printing a document from a Box is disabled.

On the other hand, upon determining in S604 that the User a is permitted to use the function for printing a document from a Box, in step S606 the control unit 60 checks the attribute information 306 of the document and determines whether the document is a scanned document. If the document is not a scanned document, the control unit 60 moves the processing to S609.

On the other hand, upon determining in S606 that the document is a scanned document, in step S607 the control unit 60 checks the user information 304 and group information 305. Subsequently, in step S608 the control unit 60 determines whether the user who stored the document is the User a, who is the logged-in user. If the user who stored the document is the User a, the control unit 60 determines that the user is a copy-prohibited user, moves the processing to the above-described S605, and causes the liquid crystal display unit 401 to display an error display 1400 shown in FIG. 14. FIG. 14 is a diagram showing the error display 1400. If the function for printing a document from a Box is prohibited according to the function restriction information, the control unit 60 displays the error display 1400 as a pop-up window on the setting screen 900.

On the other hand, upon determining that the user who stored the document is not the User a, the control unit 60 determines that the user is permitted to execute the function for printing a document from a Box, and moves the processing to S609. In step S609, the control unit 60 executes the processing for printing a document from a Box with use of the printer unit 55.

The following describes details of a method for specifying a user in the processing of S607, in the case of using the management list 400 or management list 500. The management list 400 shown in FIG. 4 is used in a case of performing function restriction with respect to individual users, and the permission groups 1025 are mapped to the usernames 1021 and uids 1022. Here, assume a case in which the logged-in User a belongs to the "Limited User" permission group 1025.

According to the individual function restrictions, the User a is permitted to read an original to a Box and print a document from a Box (see data 1008 and 1010 in FIG. 3). However, in the present embodiment, the User a is prohibited from executing the original reading function and document printing function in combination. In other words, this is due to the fact that the User a is prohibited from using the copy function (see data 1009 in FIG. 3). Therefore, the control unit 60 specifies such function restrictions from the user information 304 and attribute information 306 shown in FIG. 6.

The management list 500 shown in FIG. 5 is used in a case of a desire to perform function restriction with respect to user groups, and the permission groups 1025 are mapped to the group names 1023 and gids 1024 to which the users in such user groups belong. Here, assume a case in which the logged-in User a belongs to the "Dev N" group name 1023, and "Dev N" is mapped to the "Limited User" permission group 1025.

According to the individual function restrictions, the User a who belongs to "Dev N" is permitted to read an original to a Box and print a document from a Box (see data 1008 and 1010 in FIG. 3). However, in the present embodiment, the User a is prohibited from executing a combination of the original reading function and document printing function. In other words, this is due to the fact that the User a who belongs to "Dev N" is prohibited from using the copy function (see data 1009 in FIG. 3). Therefore, the control unit 60 specifies such function restrictions from the group information 305 and attribute information 306 shown in FIG. 6.

Furthermore, in the example using the management list 500, since the permission groups 1025 are set in association with groups, a User b who belongs to the same group (i.e., the same "Dev N") is prohibited from performing printing, for example, the document stored by the User a. However, the document stored by the User a can be printed by a user who belongs to a group for which copying is enabled (e.g., a User e). Specifically, the User e belongs to "Dev O", that is to say, the User e is a "General User" for whom copying is permitted as shown in the function restriction information 1011 shown in FIG. 3. Also, the User a can print a document that has been stored by the User e who belongs to the group for which copying is enabled.

As described above, in a case of executing a function indicated by an authenticated user, the image processing apparatus according to the present embodiment acquires function restriction information corresponding to the user, and if a function whose use is restricted by the function restriction information can be realized by combining other functions, the image processing apparatus restricts the use of such other functions. Accordingly, even if a restricted function can be realized by combining a plurality of other functions, the image processing system of the present embodiment can prevent the execution of a function that is equivalent to the restricted function by restricting the use of such other functions, thereby providing a higher level of security.

Note that the present invention is not limited to the above-described embodiment. Various modifications are also possible. For example, if a user uses the original reading function and furthermore the user is prohibited from executing the copy function according to the function restriction information, the image processing apparatus of the present embodiment stores, in addition to the read data, information indicating the user and information indicating that the data is data that has been obtained by the original reading function. Furthermore, in a case of the data being printed, the image processing apparatus of the present embodiment prohibits the data from being printed by the same user who performed the original reading function to obtain the data. Accordingly, in a case where a user is prohibited from executing the copy function, the image processing apparatus of the present embodiment enables preventing the user from realizing a function equivalent to the copy function by combining the original reading function and printing function.

The image processing system of the present embodiment may manage the user with use of unique information that is unique to each user. Also, the image processing system of the present embodiment may manage the user with use of unique information that is unique to each of a plurality of groups that each include a plurality of users. In this way, in the image processing system of the present embodiment, the form of user management can be on a user-specific basis or a group-specific basis, thereby enabling changing the form of user management to conform to the scale of the organization implementing the image processing system, as well as realizing the above-described function restrictions.

Embodiment 2

The following describes Embodiment 2 with reference to FIGS. 15 to 19. The present embodiment describes control for restricting remote copying by a user who is prohibited from using the copy function, that is to say, the concept of functions equivalent to the copy function has been expanded. Remote copying refers to a function for, for example, reading an original with use of the image processing apparatus 10 shown in FIG. 1, and causing the image processing apparatus 15 or image processing apparatus 20, which are remote, to print the original via the LAN 80. Note that in the following, descriptions that are the same as in Embodiment 1 have been omitted.

Figure 15:
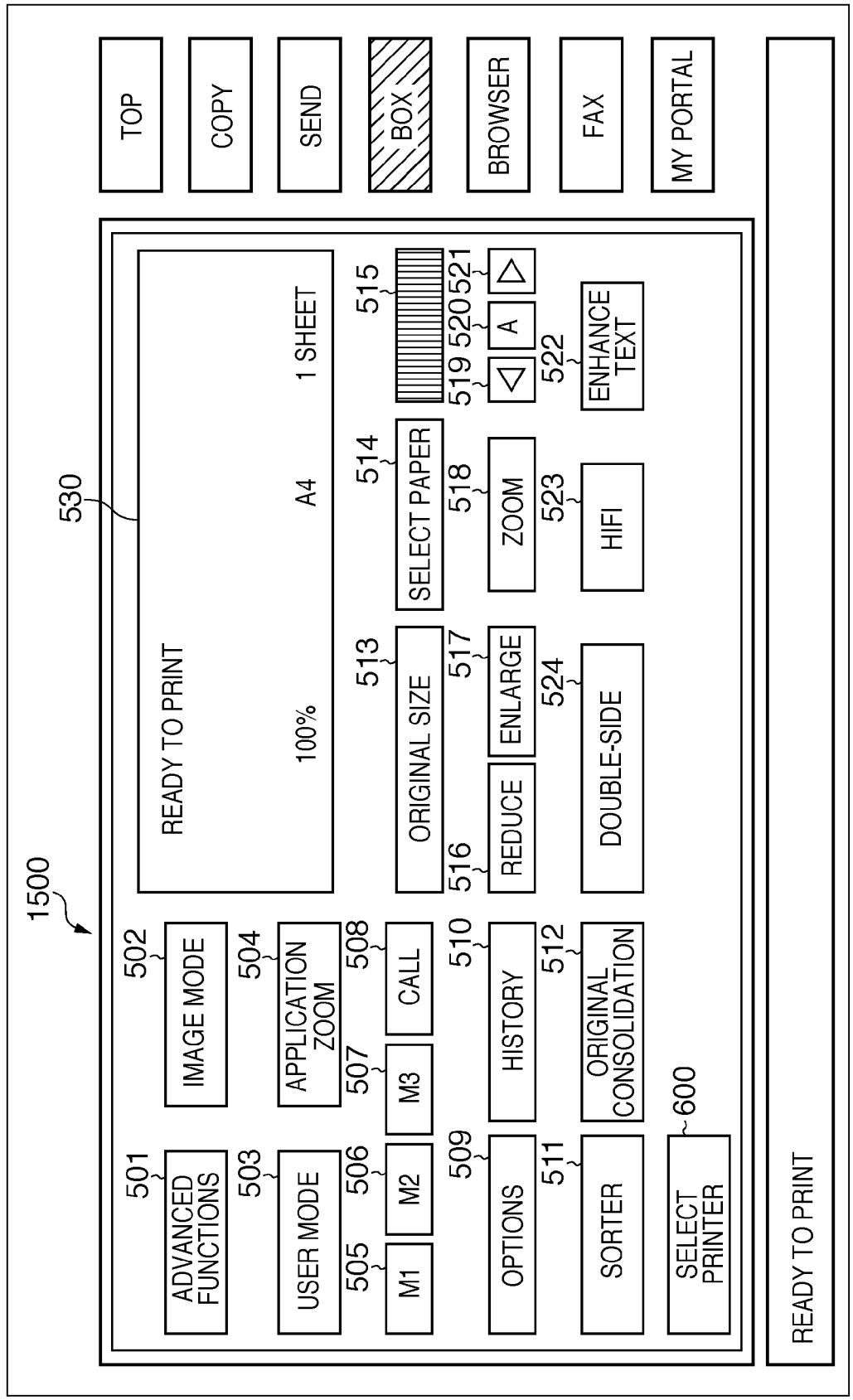
FIG. 15 is a diagram showing a setting screen 1500 for executing a copy function.

FIG. 15 is a diagram showing a setting screen 1500 for executing the copy function. The setting screen 1500 is displayed on the liquid crystal display unit 401 if the function key 404 shown in FIG. 7 has been selected. Soft keys displayed on the setting screen 1500 can be selected via a touch panel, and the functions displayed by the soft keys can be executed by touching within the frame of the soft keys.

The setting screen 1500 includes function keys 501 to 524, a setting display unit 530, and a printer selection key 600. The function keys 501 to 524 are used for performing various settings regarding copying. Detailed descriptions of the functions allocated to the function keys 501 to 524 have been omitted. The setting display unit 530 displays current settings. For example, in the exemplary display shown in FIG. 15, the setting display unit 530 shows that the magnification rate is set to "original size" (100%), the printing paper size is set to "A4", the number of print sets is set to "1", and the current status is a copy-standby status. The printer selection key 600 is a key that is pressed when selecting an image processing apparatus on the receiving side in a case of performing remote copying or cascade copying. When the printer selection key 600 has been pressed, a selection screen 1600 shown in FIG. 16 is displayed.

Figure 16:
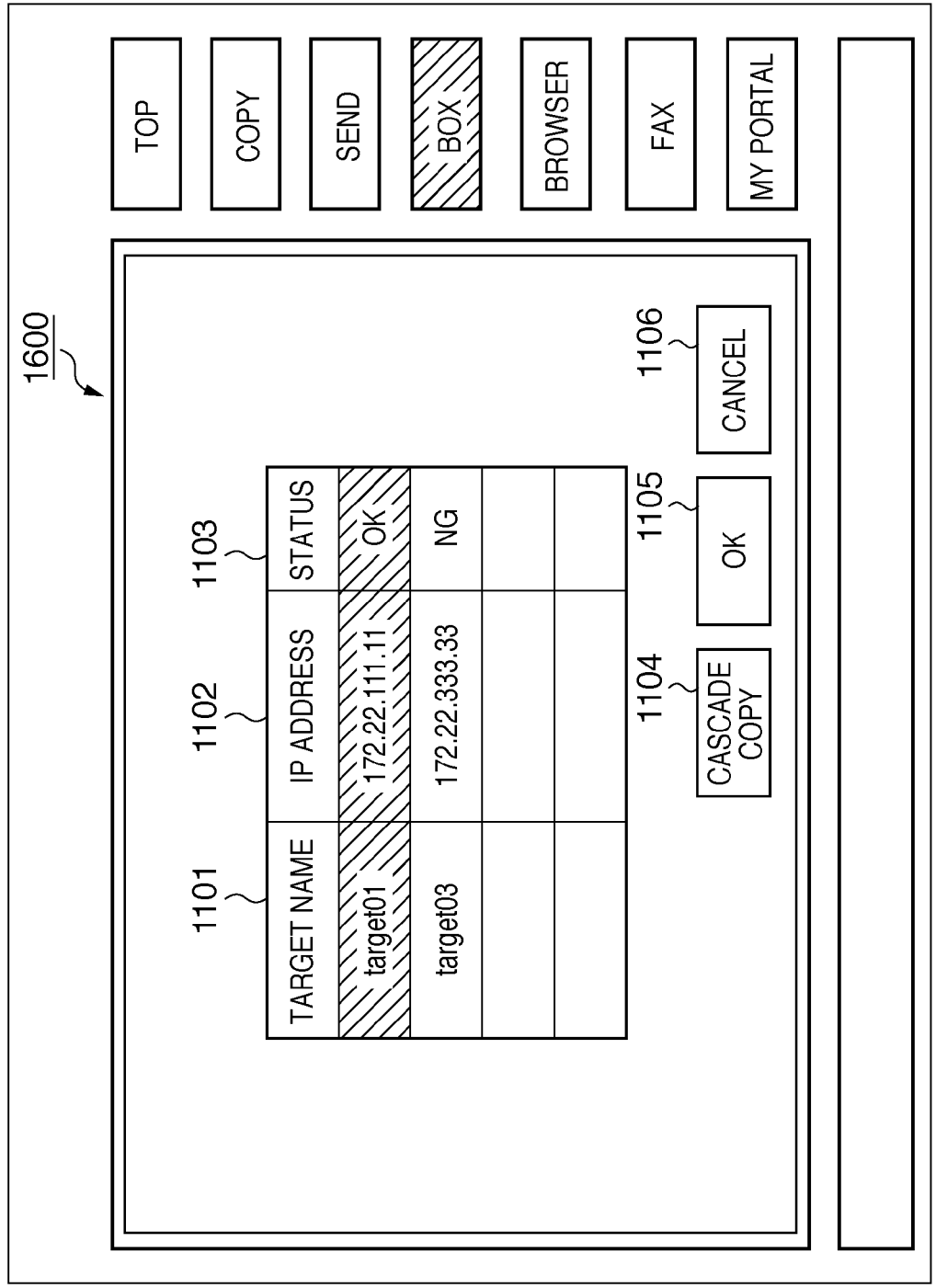
FIG. 16 is a diagram showing a selection screen 1600 for selecting an image processing apparatus on the receiving side in a case of performing remote copying or cascade copying.

FIG. 16 is a diagram showing the selection screen 1600 for selecting an image processing apparatus on the receiving side in a case of performing remote copying or cascade copying. The selection screen 1600 includes target names 1101, IP addresses 1102, statuses 1103, a cascade copy key 1104, an OK key 1105, and a cancel key 1106.

The target names 1101 are names for identifying image processing apparatuses on the receiving side. The IP addresses 1102 are the IP addresses of the image processing apparatuses on the receiving side. The statuses 1103 indicate whether a receiving device is in an operable status. The user can set a desired image processing apparatus as the image processing apparatus on the receiving side by pressing in the frame displaying the information indicating the desired image processing apparatus. When selected, the information indicating the desired image processing apparatus is displayed in a hatched condition as shown in FIG. 16. Accordingly, in the example shown in FIG. 16, the image processing apparatus having the name "target01" is selected.

The cascade copy key 1104 is selected in a case of a desire to perform printing simultaneously at an image processing apparatus on the receiving side and the image processing apparatus on the sending side in parallel. The OK key 1105 is a key for confirming (saving) the information set in the selection screen 1600. The cancel key 1106 is a key for cancelling the information set in the selection screen 1600. When the OK key 1105 or cancel key 1106 has been pressed, the setting screen 1500 is displayed.

Function Restriction Control Procedure

Figure 17:
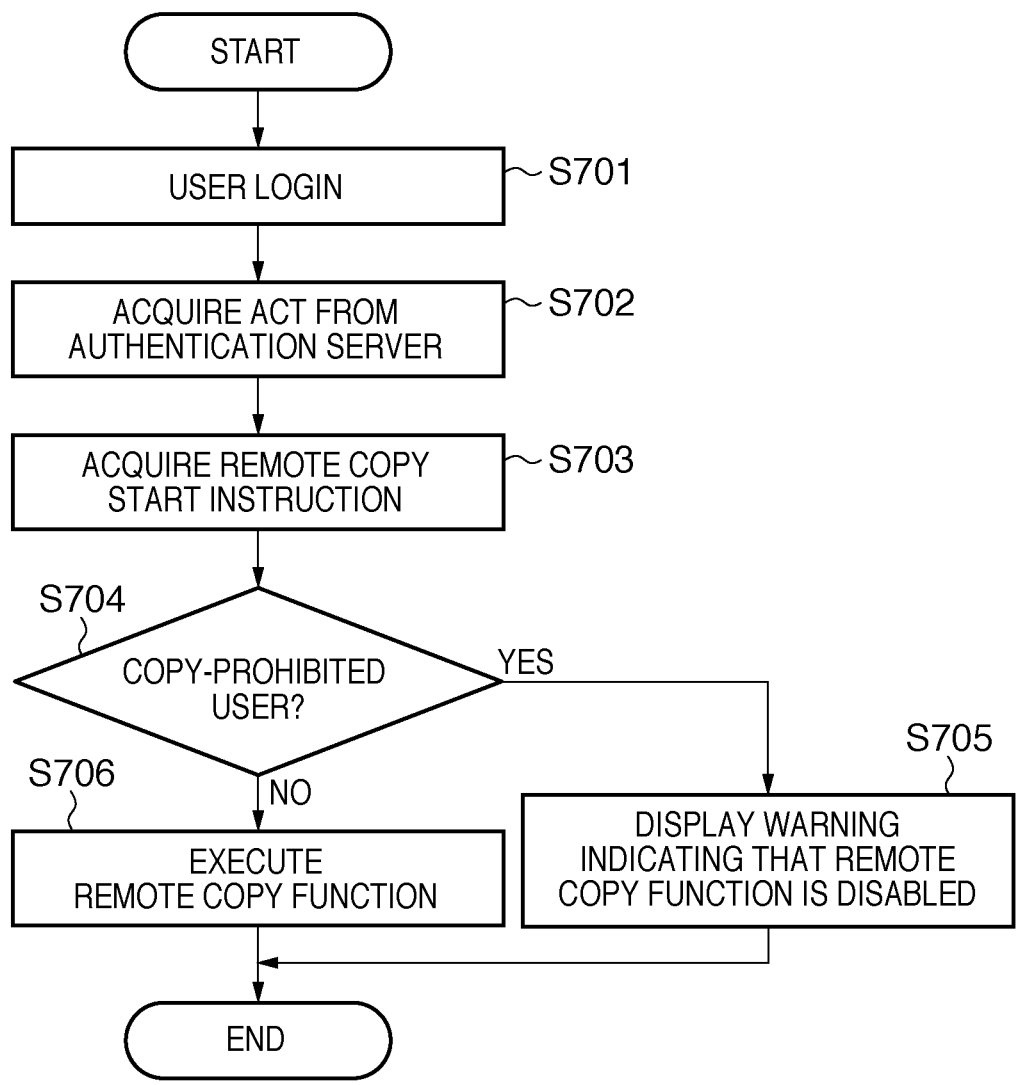
FIG. 17 is a flowchart showing a procedure for controlling a remote copy function according to Embodiment 2.

The following describes a function restriction control procedure according to the present embodiment with reference to FIG. 17. FIG. 17 is a flowchart showing a procedure for controlling a remote copy function according to Embodiment 2. Overall control of the processing described below is performed by the control unit 60 of the image processing apparatus 10.

In step S701 the control unit 60 performs the login processing (user authentication) described in FIG. 8. Here, the User a is considered to perform login. When the User a has performed login, in step S702 the control unit 60 acquires the ACT 1200 from the authentication server 30 that stores the function restriction list 35.

Next, in step S703 the control unit 60 acquires an instruction for starting remote copying (or cascade copying). Here, the user gives the instruction for the start of the copying in a condition in which, for example, an image processing apparatus on the receiving side is selected on the selection screen 1600. When the remote copying start instruction has been acquired, in step S704 the control unit 60 functions as a determination unit and determines whether the User a is prohibited from using the copy function, based on the acquired function restriction information. If the User a is prohibited from using the copy function, in step S705 the control unit 60 causes the liquid crystal display unit 401 to display an error display 1800 shown in FIG. 18 in order to show the user a warning that remote copying is disabled, and thereafter ends the processing. FIG. 18 is a diagram showing the error display 1800. As shown in FIG. 18, if the copy function is prohibited according to the function restriction information, the error display 1800 is displayed as a pop-up window on the setting screen 1500.

On the other hand, upon determining in step S704 that the User a is permitted to use the copy function, in step S706 the control unit 60 executes the remote copying. Note that although the execution of remote copying is prohibited here for a user who is prohibited from using the copy function at the image processing apparatus on the sending side, this determination may be performed by the image processing apparatus on the receiving side. In other words, if a remote copying instruction from a user who is prohibited from using the copy function is received by the image processing apparatus on the receiving side, the execution of remote copying may be denied.

As described above, in a case of executing a function instructed by an authenticated user, the image processing apparatus according to the present embodiment acquires function restriction information corresponding to the user, and if a function whose use is restricted by the function restriction information can be realized by combining other functions, the image processing apparatus restricts the use of such other functions. Accordingly, even if a restricted function can be realized by combining a plurality of other functions, the image processing system of the present embodiment can prevent the execution of a function that is equivalent to the restricted function by restricting the use of such other functions, thereby providing a higher level of security.

Note that the present invention is not limited to the above-described embodiment. Various modifications are also possible. For example, if a user attempts to use the remote copying function, and furthermore the user is prohibited from executing the copy function according to the function restriction information, the image processing apparatus of the present embodiment prohibits the execution of the remote copying function. Accordingly, in a case where a user is prohibited from executing the copy function, the image processing apparatus of the present embodiment enables preventing the user from realizing a function equivalent to the copy function by using the remote copying function.

Also, the image processing apparatus of the present embodiment can perform function restriction according to the user even in a case of an attempt to perform printing upon receiving a document stored in another image processing apparatus instead of receiving a remote copying instruction. In other words, if the input source of a document targeted for printing is a reading device, printing of the document is prohibited if the user who is attempting to give the instruction for the printing is prohibited from using the copying function. Judging whether to permit or prohibit printing in this case can be performed as described in Embodiment 1, with the exception that the targeted document is a document stored in another image processing apparatus or storage apparatus connected via the LAN 80 instead of a document stored in a Box of the own apparatus.

In the above description, a user who is prohibited from using the copy function is prohibited from performing printing if the input source of image data targeted for processing is a reading device. Additionally, printing may also be prohibited in a case where the input of the image data targeted for processing is unclear. In other words, printing is permitted only in a case where it is clear that the input source of the image data targeted for processing is not a reading device. This enables improving the precision of copying prohibition processing.

Although an example of realizing function restriction in an image processing apparatus that has an image processing function is described above, the inclusion of an image processing function is not necessary. Besides the above-described image processing functions, other image processing functions may be restricted. In other words, in an image processing apparatus having an image transmission function, the transmission of image data input from a specified input source may be prohibited. Also, instead of prohibiting all image transmission, transmission to, for example, destinations other than a specified destination may be prohibited.

In the above embodiment, restriction is performed in accordance with function restriction information if a user who input image data targeted for processing is the same as a user who performs processing on the image data. However, function restriction may be performed regardless of whether the above users are the same.

Other Embodiments

As described above, the object of the present invention can also be achieved by supplying a system or apparatus with a storage medium having recorded thereon program code of software for realizing the functionality of the above-described embodiment, and by a computer (a CPU, MPU or the like) of the system or apparatus reading and executing the stored program code.

In this case, the actual program code read from the storage medium realizes the new functionality of the present invention, and the storage medium that stores the program code constitutes the present invention.

Accordingly, any mode of program, such as object code, a program executed by an interpreter, or script data supplied to an OS (operating system), is acceptable, as long as the functionality of the program is provided.

Examples of a storage medium for supplying the program include a flexible disk, a hard disk, an optical disk, a magneto-optical disk, an MO, a CD-ROM, a CD-R, and a CD-RW. Other examples include magnetic tape, a nonvolatile memory card, a ROM, and a DVD.

In this case, the actual program code read from the storage medium realizes the functionality of the above-described embodiment, and the storage medium that stores the program code constitutes the present invention.

Also, one method of supplying the program is a method of connecting to a website on the Internet using the browser of a client computer, and downloading the computer program of the present invention from the website to a recording medium such as an HDD. Alternatively, the program can be supplied by downloading a compressed file that includes an auto-install function to a recording medium such as a hard disk. Supply of the program can also be realized by splitting the program code constituting the program of the present invention into a plurality of files and downloading the respective files from different websites. In other words, the claims of the present invention also encompass a WWW server, ftp server or the like that allows a plurality of operators to download program files for realizing the functionality and processes of the present invention with use of a computer.

Also, the program of the present invention can be distributed to operators as an encrypted program stored on a storage medium such as a CD-ROM. In this case, operators that satisfy a predetermined condition can be allowed to download decryption key information from a website via the Internet. The encrypted program is executed and installed on a computer using the key information, thereby realizing the functionality and processes of the present invention.

Also, in addition to a computer reading out and executing the program code, an OS or the like that is running on a computer can perform part or all of the actual processing based on instructions in the program code, thereby realizing the functionality and processes of the present invention.

Furthermore, the program code read from the storage medium can be written to a memory provided in a function expansion board inserted in a computer or a function expansion unit connected to a computer. In this case, a CPU or the like provided in the function expansion board or the function expansion unit performs part or all of the actual processing based on instructions in the program code, thereby realizing the functionality and processes of the present invention.

Also, the present invention may be applied to a system constituted from a plurality of apparatuses, or may be applied to an apparatus constituted from a single device. Also, needless to say, the present invention is applicable in a case where the functionality and processes of the present invention are achieved by supplying the program to a system or apparatus. In this case, the system or apparatus can benefit from the effects of the present invention by reading the storage medium that stores the program expressed by software for achieving the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-113229 filed on Apr. 23, 2008, which is hereby incorporated by reference herein in its entirety.

The invention claimed is:

1. An image processing apparatus comprising:
   a reading unit configured to read an image of an original document and generate image data corresponding to the image of the original document;
   a storage unit configured to store the generated image data and attribute information of the image data indicating a source of the image data;
   a printing unit configured to print the image data generated by the reading unit;
   an acquisition unit configured to acquire restriction information corresponding to a user of the image processing apparatus for restricting an image processing function; and
   a control unit configured to, if the restriction information acquired by the acquisition unit indicates that use of a copy function is restricted, and the attribute information of the image data indicates the reading unit, control to restrict the printing of the image data stored in the storage unit performed by the printing unit, even if the restriction information acquired by the acquisition unit further indicates that use of a print function is permitted.

2. The image processing apparatus of claim 1, wherein the control unit determines whether a user who input the image data with use of the source and a user who is to process the image data with use of the processing unit are the same user, and in a case of determining affirmatively, the control unit controls so that the printing performed by the printing unit is restricted, based on the restriction information acquired by the acquisition unit.

3. The image processing apparatus of claim 1, wherein the user is a user specified by unique information that is unique to each of a plurality of groups that each include a plurality of users.

4. The image processing apparatus of claim 1, further comprising an input unit configured to input image data received from a network.

5. A method for image processing of an image processing apparatus having a reading unit configured to read an image of an original document and generate image data corresponding to the image of the original document, comprising:
   generating image data;
   storing the generated image data and attribute information of the image data indicating a source of the image data in a storage unit;
   printing the image data stored in the storage unit;
   acquiring restriction information corresponding to a user of the image processing apparatus for restricting an image processing function; and
   restricting the printing of the image data stored in the storage unit, even if the restriction information acquired by the acquisition unit indicates that use of a print function is permitted, if the acquired restriction information further indicates that use of a copy function is restricted, and the attribute information of the image data indicates the reading unit.

6. A non-transitory storage medium storing a computer program for causing a computer to execute the image processing method according to claim 5.

* * * * *